United States Patent
Yamada et al.

(12)

(10) Patent No.: US 11,548,584 B2
(45) Date of Patent: Jan. 10, 2023

(54) SADDLE RIDING TYPE VEHICLE

(71) Applicant: HONDA MOTOR CO., LTD., Tokyo (JP)

(72) Inventors: Shinichi Yamada, Wako (JP); Kenichi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 17/263,367

(22) PCT Filed: May 17, 2019

(86) PCT No.: PCT/JP2019/019777
§ 371 (c)(1),
(2) Date: Jan. 26, 2021

(87) PCT Pub. No.: WO2020/031455
PCT Pub. Date: Feb. 13, 2020

(65) Prior Publication Data
US 2021/0291927 A1 Sep. 23, 2021

(30) Foreign Application Priority Data
Aug. 9, 2018 (JP) .............................. JP2018-150586

(51) Int. Cl.
*B62K 19/38* (2006.01)
*B62L 1/00* (2006.01)
(Continued)

(52) U.S. Cl.
CPC .............. *B62K 19/38* (2013.01); *B62J 45/413* (2020.02); *B62K 21/02* (2013.01); *B62L 1/005* (2013.01); *B62L 3/023* (2013.01)

(58) Field of Classification Search
CPC ......... B62L 1/005; B62K 19/38; B62J 45/413
(Continued)

(56) References Cited

U.S. PATENT DOCUMENTS 8,651,213 B2 * 2/2014 Nagakubo .............. B62K 19/38
180/218
8,887,859 B2 * 11/2014 Matsushima ........... B60T 17/04
180/312
(Continued)

FOREIGN PATENT DOCUMENTS

DE 102020203333 A1 * 10/2020 ............ B60T 17/046
EP 3715234 A1 * 9/2020 ............ B60T 8/1706
(Continued)

OTHER PUBLICATIONS

International Preliminary Report on Patentability dated Feb. 18, 2021, 8 pages.
(Continued)

*Primary Examiner* — Kevin Hurley
*Assistant Examiner* — Hosam Shabara
(74) *Attorney, Agent, or Firm* — Rankin, Hill & Clark LLP

(57) ABSTRACT

A saddle riding type vehicle having a front fork that supports a front wheel, a head pipe that rotationally movably supports the front fork, a down frame extending downward from the head pipe, a front wheel brake supported by the front fork, to brake the front wheel, a braking force adjustment device that controls braking force of the front wheel brake, and output piping that connects the braking force adjustment device and the front wheel brake, the output piping has metal piping extending forward from the braking force adjustment device disposed behind the down frame, flexible piping, and a connecting member that connects the metal piping and the flexible piping. The connecting member is disposed in front of the down frame, and the flexible piping extends forward from the connecting member, to be connected to the front wheel brake.

7 Claims, 6 Drawing Sheets

(51) Int. Cl.
*B62J 45/413* (2020.01)
*B62K 21/02* (2006.01)
*B62L 3/02* (2006.01)

(58) Field of Classification Search
USPC .......................................................... 180/219
See application file for complete search history.

(56) References Cited

U.S. PATENT DOCUMENTS

| | | | | |
|---|---|---|---|---|
| 10,093,385 | B2* | 10/2018 | Takatsuka | B60T 8/3685 |
| 2005/0134114 | A1* | 6/2005 | Asahi | B60T 8/3685 |
| | | | | 303/137 |
| 2009/0243378 | A1* | 10/2009 | Ito | B62K 11/04 |
| | | | | 303/28 |
| 2013/0009378 | A1 | 1/2013 | Nagakubo et al. | |

FOREIGN PATENT DOCUMENTS

| | | |
|---|---|---|
| JP | 2013-124071 A | 6/2013 |
| JP | 2014-015134 A | 1/2014 |
| JP | 2014-034339 | 2/2014 |
| JP | 2016-182838 | 10/2016 |
| JP | 2017-177839 | 10/2017 |
| JP | 2019119440 A * | 7/2019 ............ B62K 11/00 |
| WO | 2011/114631 | 9/2011 |

OTHER PUBLICATIONS

European Search Report dated Sep. 13, 2021, 9 pages.
Indonesian Office Action with English translation dated Jan. 31, 2022, 6 pages.
Chinese Office Action with English translation dated Oct. 29, 2021, Application No. 201980059388.3, 23 pages.
Japanese Office Action with English translation dated Dec. 14, 2021, Application No. 2020-536332, 11 pages.
International Search Report, dated Jul. 30, 2019 (Jul. 30, 2019), 1 page.
Written Opinion of the International Searching Authority dated Jul. 31, 2019 in PCT/JP2019/019777.
Indian Office Action dated Aug. 23, 2021, 6 pages.

* cited by examiner

SADDLE RIDING TYPE VEHICLE

TECHNICAL FIELD

The present invention relates to a saddle riding type vehicle.

BACKGROUND ART

Heretofore, a saddle riding type vehicle has been known in which brake piping extends forward from a braking force adjustment device disposed behind a down frame, to be connected to a front wheel brake (e.g., see Patent Literature 1). In Patent Literature 1, the brake piping having flexibility extends forward from the braking force adjustment device, to be supported by a hose holding member provided in a bottom bridge of a front fork, or the like.

CITATION LIST

Patent Literature

Patent Literature 1: Japanese Patent Laid-Open No. 2016-182838

SUMMARY OF INVENTION

Technical Problem

In a saddle riding type vehicle, it is desirable that support parts for brake piping can be decreased between a braking force adjustment device and a front wheel brake.

The present invention is developed in view of the above situations, and an object thereof is to provide a saddle riding type vehicle in which support parts for brake piping can be decreased.

Solution to Problem

In this description, all contents of Japanese Patent Application No. 2018-150586 filed on Aug. 9, 2018 are included.

According to an aspect of the present invention, provided is a saddle riding type vehicle comprising a front fork (12) that supports a front wheel (2), a head pipe (15) that rotationally movably supports the front fork (12), a down frame (17) extending downward from the head pipe (15), a front wheel brake (58) supported by the front fork (12), to brake the front wheel (2), a braking force adjustment device (59) that controls braking force of the front wheel brake (58), and brake piping (62) that connects the braking force adjustment device (59) and the front wheel brake (58), wherein the brake piping (62) comprises metal piping (71) extending forward from the braking force adjustment device (59) disposed behind the down frame (17), flexible piping (72), and a connecting part (73) that connects the metal piping (71) and the flexible piping (72), the connecting part (73) is disposed in front of the down frame (17), and the flexible piping (72) extends forward from the connecting part (73), to be connected to the front wheel brake (58).

Furthermore, in the above aspect of the present invention, the connecting part (73) may be disposed behind the front fork (12).

Additionally, in the above aspect of the present invention, the connecting part (73) may be fixed to a stay (75) extending forward from the down frame (17).

Furthermore, in the above aspect of the present invention, the front wheel brake (58) may be disposed on one side of the down frame (17) in a vehicle width direction, and the connecting part (73) may be disposed on the other side of the down frame (17) in the vehicle width direction.

Additionally, in the above aspect of the present invention, the flexible piping (72) may extend in an upward posture forward from the connecting part (73) in vehicle side view.

Furthermore, in the above aspect of the present invention, a stopper (75c) that regulates rotational movement of the connecting part (73) in an up-down direction may be provided.

Additionally, in the above aspect of the present invention, a fender (54) that covers the front wheel (2) from above may be provided, and a fender guard (84) that receives the flexible piping (72) may be provided between the fender (54) and the flexible piping (72).

Furthermore, in the above aspect of the present invention, an intermediate part of the flexible piping (72) between the connecting part (73) and the front wheel brake (58) may be fixed to the fender (54).

Additionally, in the above aspect of the present invention, a sensor (69) that detects rotation of the front wheel (2) may be provided, and a cable (69b) of the sensor (69) may be fixed to the stay (75).

Advantageous Effects of Invention

According to an aspect of the present invention, a saddle riding type vehicle comprises a front fork that supports a front wheel, a head pipe that rotationally movably supports the front fork, a down frame extending downward from the head pipe, a front wheel brake supported by the front fork, to brake the front wheel, a braking force adjustment device that controls braking force of the front wheel brake, and brake piping that connects the braking force adjustment device and the front wheel brake, the brake piping comprises metal piping extending forward from the braking force adjustment device disposed behind the down frame, flexible piping, and a connecting part that connects the metal piping and the flexible piping, the connecting part is disposed in front of the down frame, and the flexible piping extends forward from the connecting part, to be connected to the front wheel brake. According to this configuration, the connecting part that connects the metal piping and the flexible piping is located in front of the down frame, and the metal piping noticeably extends forward. Therefore, the flexible piping can be supported by using high rigidity of the metal piping. Consequently, support parts for the brake piping can be decreased.

Furthermore, in the above aspect of the present invention, the connecting part may be disposed behind the front fork. According to this configuration, the connecting part can be disposed without disturbing steering of the front fork, while a length of the flexible piping can be acquired, and the flexible piping can be efficiently bent.

Additionally, in the above aspect of the present invention, the connecting part may be fixed to a stay extending forward from the down frame. According to this configuration, the connecting part can be firmly supported at a position in front of the down frame by the stay extending forward from the down frame.

Furthermore, in the above aspect of the present invention, the front wheel brake may be disposed on one side of the down frame in a vehicle width direction, and the connecting part may be disposed on the other side of the down frame in the vehicle width direction. According to this configuration, a large length of the flexible piping can be acquired, and hence the flexible piping can be efficiently bent.

Additionally, in the above aspect of the present invention, the flexible piping may extend in an upward posture forward from the connecting part in vehicle side view. According to this configuration, the large length of the flexible piping can be acquired, and hence the flexible piping can be efficiently bent.

Furthermore, in the above aspect of the present invention, a stopper that regulates rotational movement of the connecting part in an up-down direction may be provided. According to this configuration, the rotational movement of the connecting part in the up-down direction can be regulated with the stopper, and shaking of the flexible piping can be appropriately regulated.

Additionally, in the above aspect of the present invention, a fender that covers the front wheel from above may be provided, and a fender guard that receives the flexible piping may be provided between the fender and the flexible piping. According to this configuration, the fender guard can prevent contact between the flexible piping and the fender, and can protect the flexible piping and the fender.

Furthermore, in the above aspect of the present invention, an intermediate part of the flexible piping between the connecting part and the front wheel brake may be fixed to the fender. According to this configuration, the flexible piping can be supported by using the fender.

Additionally, in the above aspect of the present invention, a sensor that detects rotation of the front wheel may be provided, and a cable of the sensor may be fixed to the stay. According to this configuration, the cable of the sensor can be fixed by using the stay for the brake piping.

DESCRIPTION OF EMBODIMENTS

Hereinafter, description will be made as to an embodiment of the present invention with reference to the drawings. Note that in the description, front, rear, left, right, up and down directions are the same as those for a vehicle body unless otherwise mentioned. Furthermore, sign FR shown in the respective drawings indicates a vehicle body front, sign UP indicates a vehicle body upside, and sign LH indicates a vehicle body left.

Figure 1:
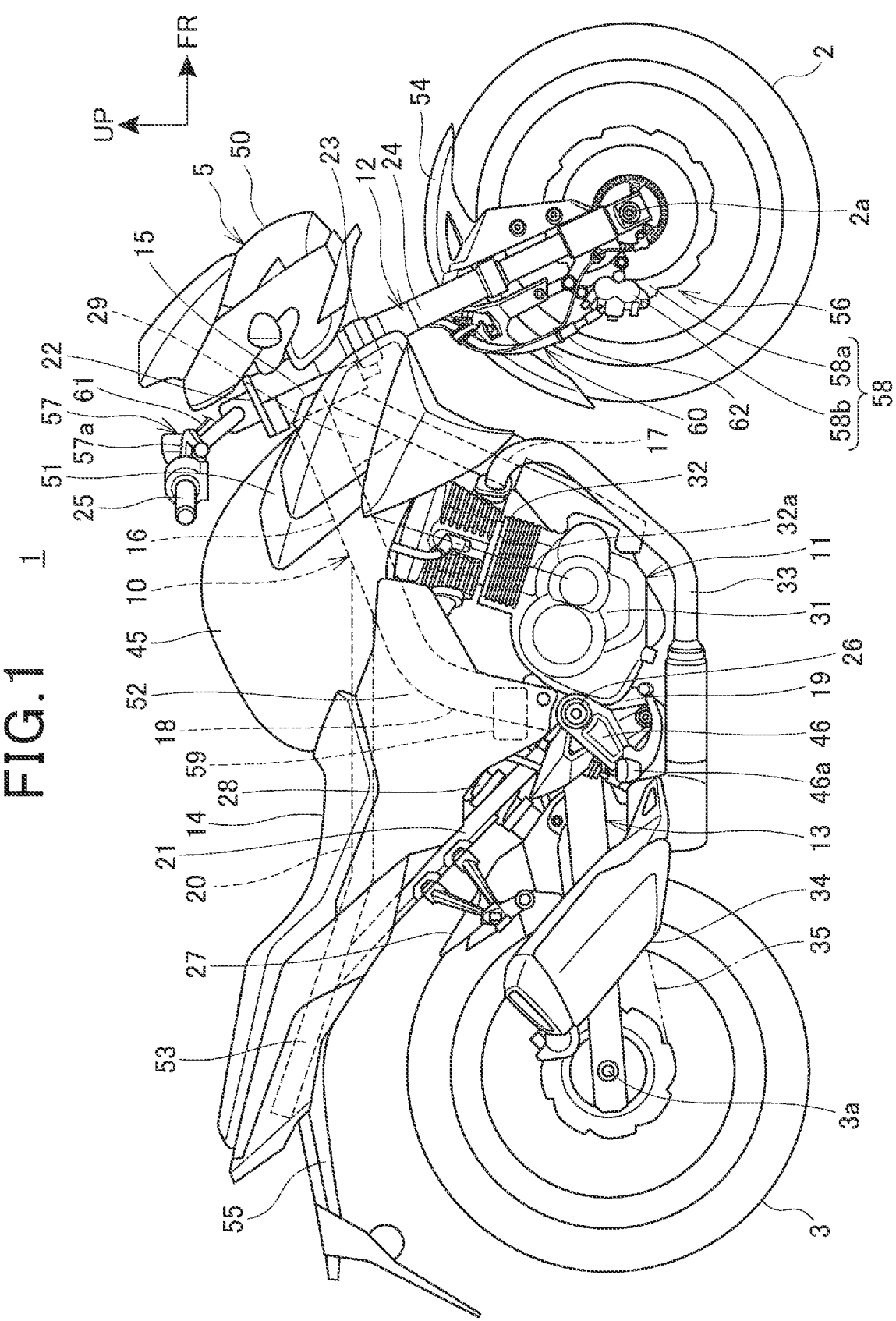
FIG. 1 is a right side view of a motorcycle according to an embodiment of the present invention.

FIG. 1 is a right side view of a motorcycle according to the embodiment of the present invention.

A motorcycle 1 is a vehicle in which an engine 11 is supported as a power unit by a vehicle body frame 10, a front fork 12 that steerably supports a front wheel 2 is steerably supported at a front end of the vehicle body frame 10, and a swing arm 13 that supports a rear wheel 3 is provided in a rear part of the vehicle body frame 10.

The motorcycle 1 is a saddle riding type vehicle comprising a seat 14 on which a passenger sits by straddling, the seat being provided above the rear part of the vehicle body frame 10.

The motorcycle 1 comprises a vehicle body cover 5 that covers a vehicle body such as the vehicle body frame 10.

The vehicle body frame 10 comprises a head pipe 15 provided at the front end of the vehicle body frame 10, a main frame 16 extending rearward in a downward posture from a rear part of the head pipe 15, a down frame 17 extending downward and rearward at the rear part of the head pipe 15 from below the main frame 16, a center frame 18 extending downward from a rear end portion of the main frame 16, and a pivot frame 19 connected to a lower end portion of the center frame 18. Each of the main frame 16, the down frame 17 and the center frame 18 is one tubular frame, and located at a center in a vehicle width direction in the same manner as in the front wheel 2.

Furthermore, the vehicle body frame 10 comprises a plate-like gusset 29 that connects a front end portion of the main frame 16 and a front end portion of the down frame 17 in an up-down direction.

Additionally, the vehicle body frame 10 comprises a pair of right and left seat frames 20 extending rearward from a rear part of the main frame 16 to a vehicle rear end portion, and a pair of right and left sub frames 21 extending in an upward posture rearward from the pivot frame 19 and connected to rear parts of the seat frames 20.

The front fork 12 comprises a steering shaft (not shown) rotationally movably pivoted by the head pipe 15, a top bridge 22 fixed to an upper end of this steering shaft, a bottom bridge 23 fixed to a lower end of the steering shaft, a pair of right and left fork tubes 24, 24 supported by the top bridge 22 and the bottom bridge 23, respectively, and a steering handle 25 fixed to the top bridge 22.

The top bridge 22 and the bottom bridge 23 extend from the steering shaft in the vehicle width direction, to couple the right and left fork tubes 24, 24.

The head pipe 15 is disposed to be inclined rearward. The fork tubes 24, 24 are also arranged to be inclined rearward in correspondence with a caster angle of the motorcycle 1.

The front wheel 2 is pivoted by an axle 2a disposed across lower end portions of the right and left fork tubes 24, 24.

In the pivot frame 19, a pivot shaft 26 extending through the pivot frame 19 in the vehicle width direction is provided. The pivot shaft 26 is provided in an intermediate part of the pivot frame 19 in the up-down direction.

A front end portion of the swing arm 13 is pivoted by the pivot shaft 26, and the swing arm 13 is slidable in the up-down direction with the pivot shaft 26 in the center.

The rear wheel 3 is pivoted by an axle 3a provided in a rear end portion of the swing arm 13.

An inner fender 27 that covers a front part of the rear wheel 3 from above is attached to an upper surface of the swing arm 13.

A rear suspension 28 is disposed over a space between the swing arm 13 and the rear part of the vehicle body frame 10.

The engine 11 comprises a crank case 31 containing a crank shaft, and a cylinder part 32 extending upward from a front part of the crank case 31. A transmission (not shown) is built-in in a rear part of the crank case 31. In the cylinder part 32, a cylinder axis 32a is inclined forward.

The engine 11 is disposed between the down frame 17 and the pivot frame 19 below the main frame 16, and the crank case 31 is supported by the down frame 17 and the pivot frame 19.

An exhaust tube 33 of the engine 11 extends downward and rearward from a front surface of the cylinder part 32, and extends rearward through a space below the engine 11, to be connected to a muffler 34 disposed on a right side of the swing arm 13.

An output of the engine 11 is transmitted to the rear wheel 3 by a drive chain 35 provided along the swing arm 13.

A fuel tank 45 is supported by the main frame 16. The seat 14 is supported by the seat frames 20 from below, and extends to a rear end portion of the motorcycle 1 continuously with the fuel tank 45.

A pair of right and left step brackets 46 are attached to right and left side surface parts of the pivot frame 19, respectively. A pair of right and left steps 46a on which the passenger places feet are supported by the step brackets 46.

The vehicle body cover 5 comprises a front cover 50 that covers the head pipe 15 from the front, a pair of right and left front side covers 51 that cover a front part of the vehicle body frame 10 from the sides, a pair of right and left side covers 52 that cover lower front parts of the fuel tank 45 and the seat 14, and a pair of right and left rear side covers 53 that cover a lower rear part of the seat 14.

The motorcycle 1 comprises a front fender 54 (a fender) that covers the front wheel 2 from above, and a rear fender 55 that covers the rear wheel 3 from above.

Figure 2:
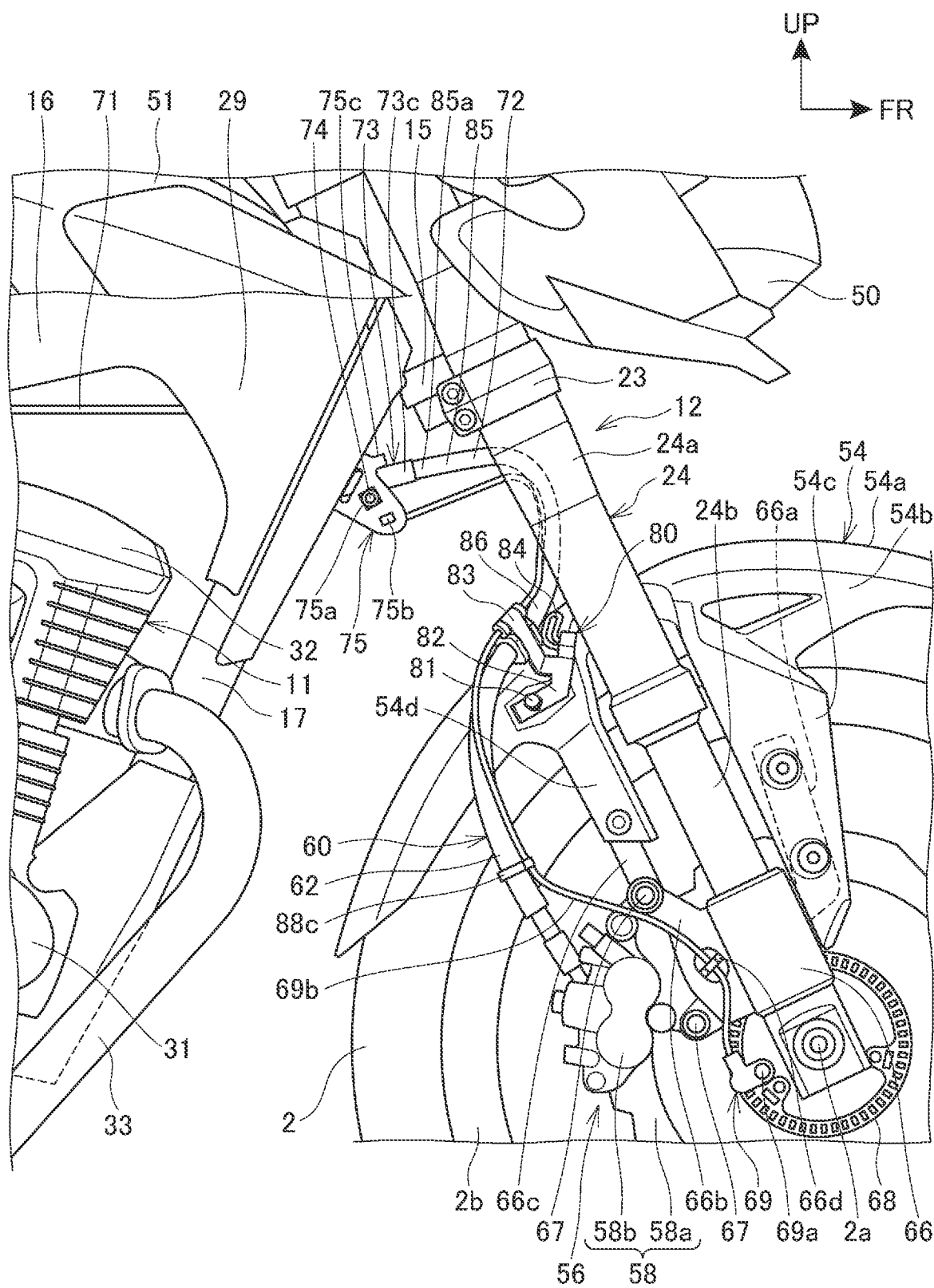
FIG. 2 is a right side view of a front part of the motorcycle.

FIG. 2 is a right side view of a front part of the motorcycle 1. FIG. 2 does not show a part of the vehicle body cover 5.

With reference to FIG. 1 and FIG. 2, the motorcycle 1 comprises a front wheel brake device 56 that brakes the front wheel 2.

The front wheel brake device 56 comprises a master cylinder 57 for the front wheel into which a passenger's operation is input, a front wheel brake 58 that brakes the front wheel 2 with friction, a braking force adjustment device 59 that controls braking force of the front wheel brake 58, and front wheel brake piping 60 that connects the master cylinder 57 for the front wheel to the braking force adjustment device 59 and that connects the braking force adjustment device 59 to the front wheel brake 58.

The front wheel brake piping 60 comprises input piping 61 that connects the master cylinder 57 for the front wheel to the braking force adjustment device 59, and output piping 62 (brake piping) that connects the braking force adjustment device 59 to the front wheel brake 58.

The input piping 61 extends downward and rearward from the master cylinder 57 for the front wheel, to be connected to the braking force adjustment device 59.

The front wheel brake device 56 is a hydraulic type. A passenger's brake operation input via a brake lever 57a of the master cylinder 57 for the front wheel provided in the handle 25 is transmitted as hydraulic pressure to the front wheel brake 58 through the input piping 61, the braking force adjustment device 59 and the output piping 62.

The front wheel brake 58 comprises a brake disk 58a that rotates integrally with the front wheel 2, and a caliper 58b that presses the brake disk 58a with the hydraulic pressure.

The braking force adjustment device 59 is an anti-lock brake system (ABS) module that controls the hydraulic pressure of the front wheel brake 58 to prevent locking of the front wheel 2.

The braking force adjustment device 59 comprises a pump driven by a motor to adjust the hydraulic pressure, a hydraulic pressure circuit part connected to this pump, a valve that switches this hydraulic pressure circuit part, an electronic controller part that controls the above-described motor, and others. The braking force adjustment device 59 is formed in an almost rectangular box shape in vehicle side view.

The braking force adjustment device 59 is fixed to the vehicle body frame 10 via a stay (not shown). The braking force adjustment device 59 is disposed above the pivot frame 19 on a left or right side (the right side) of the center frame 18. The braking force adjustment device 59 overlaps with a lower part of the center frame 18 from outside in the vehicle side view, and is disposed outside and beside the center frame 18 in the vehicle width direction.

The braking force adjustment device 59 is disposed above the swing arm 13, behind the crank case 31 and in front of the sub frame 21 in the vehicle side view.

As shown in FIG. 2, each of the fork tubes 24 comprises a fixed tube 24a fixed to the top bridge 22 and the bottom bridge 23, and a movable tube 24b capable of making stroke to the fixed tube 24a in an axial direction.

In a lower end portion of the movable tube 24b, a bottom case 66 that supports the axle 2a is provided.

The bottom case 66 for each of the right and left fork tubes 24, 24 comprises a fender stay 66a extending upward from a front part of the bottom case 66. The bottom case 66 for the right fork tube 24 comprises a caliper bracket 66b extending rearward from a rear part of the bottom case 66. The caliper bracket 66b comprises a fender stay 66c extending upward along the fork tube 24.

The caliper 58b of the front wheel brake 58 is fixed to the caliper bracket 66b via a bolt 67. The caliper 58b is disposed on one side (the right side) of the front wheel 2 in the vehicle width direction, and disposed behind the bottom case 66 and inside an outer circumferential part of the wheel 2b of the front wheel 2 in the vehicle side view.

In a center part of the wheel 2b of the front wheel 2, a pulser rotor 68 that rotates integrally with the wheel 2b is provided. A wheel speed sensor 69 (a sensor) that detects the rotation of the pulser rotor 68 is fixed to the rear part of the right bottom case 66. The wheel speed sensor 69 is disposed between the axle 2a and the caliper 58b in the vehicle side view. The wheel speed sensor 69 comprises a sensor body part 69a that overlaps with the pulser rotor 68 from the outside in the vehicle width direction, and a cable 69b extending from the sensor body part 69a.

The cable 69b is connected to a control unit (not shown) of the motorcycle 1, and this control unit obtains a rotating state of the front wheel 2 and a vehicle speed of the motorcycle 1 from a detected value of the wheel speed sensor 69.

Figure 3:
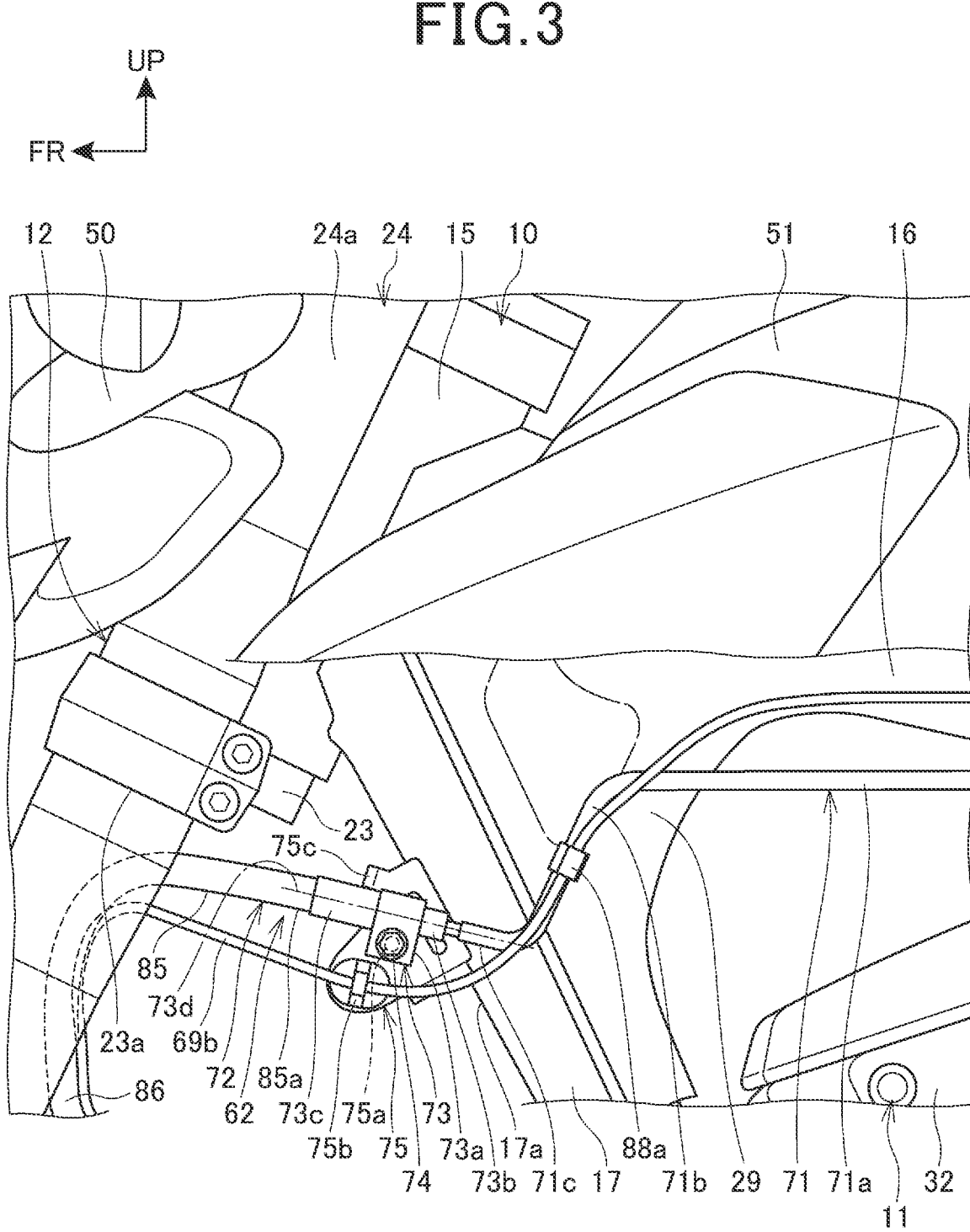
FIG. 3 is a left side view of the front part of the motorcycle.

FIG. 3 is a left side view of the front part of the motorcycle 1. FIG. 3 does not show a part of the vehicle body cover 5.

With reference to FIG. 1 to FIG. 3, the output piping 62 of the front wheel brake piping 60 extends upward and forward from the braking force adjustment device 59 disposed beside the center frame 18, extends forward through an upper side part of the down frame 17, and extends downward below the bottom bridge 23, to be connected to the caliper 58b.

In detail, the output piping 62 comprises metal piping 71 extending forward from the braking force adjustment device 59 to a down frame 17 side, flexible piping 72 connected to the caliper 58b, and a connecting member 73 (a connecting part) that connects the metal piping 71 and the flexible piping 72.

The metal piping 71 is a metal tube made of, for example, an iron-based material.

The metal piping 71 has a base end portion connected to the braking force adjustment device 59. The metal piping 71 extends from the braking force adjustment device 59 disposed on one side (the right side) of the center frame 18 in the vehicle width direction, straddles the center in the vehicle width direction to extend to the other side (a left side) in the vehicle width direction, and extends upward and forward through the left side of the vehicle body frame 10.

As shown in FIG. 3, the metal piping 71 comprises, on the left side of the vehicle body frame 10, a forward extending tube 71a extending almost horizontally and forward above the cylinder part 32 of the engine 11, a downward extending tube 71b extending downward, forward and obliquely from a front end of the forward extending tube 71a, and a front end portion 71c extending in a slightly upward posture forward from a lower end of the downward extending tube 71b.

The forward extending tube 71a overlaps with the main frame 16 and the gusset 29 in the vehicle side view. The forward extending tube 71a is at a position that overlaps with the bottom bridge 23 in a height direction of the motorcycle 1.

The downward extending tube 71b overlaps with the gusset 29 in the vehicle side view. The lower end of the downward extending tube 71b is located below the bottom bridge 23.

The front end portion 71c overlaps with an upper part of the down frame 17 in the vehicle side view. The front end portion 71c is located below the bottom bridge 23 and above the cylinder part 32.

A front end of the front end portion 71c almost overlaps with a front surface 17a of the down frame 17 in the vehicle side view.

The connecting member 73 comprises a block-like fixing part 73a, a tubular metal piping connecting part 73b extending rearward from the fixing part 73a in the vehicle side view, and a tubular flexible piping connecting part 73c extending forward from the fixing part 73a. The connecting member 73 is made of a metal.

The vehicle body frame 10 comprises a stay 75 extending forward from the upper part of the down frame 17, and the connecting member 73 is fixed to the stay 75 via a fixture 74. Here, the fixture 74 is a bolt inserted into the fixing part 73a from the outside in the vehicle width direction.

The stay 75 extends forward from a side surface of the down frame 17 on the other side (the left side) in the vehicle width direction. The stay 75 is a plate-like member disposed in a plate thickness direction directed in the vehicle width direction.

The stay 75 is disposed behind the fork tube 24 and the bottom bridge 23 and in front of the down frame 17. The stay 75 is disposed below the bottom bridge 23 and above a front end portion of an upper surface of the cylinder part 32.

The stay 75 comprises a fixing hole 75a in which the fixture 74 is fastened, a cable support part 75b that supports the cable 69b, and a stopper 75c protruding outward from an outer surface of the stay 75 in the vehicle width direction.

The fixing hole 75a is disposed in front of the front surface 17a of the down frame 17 and behind the bottom bridge 23. The cable support part 75b is disposed below and in front of the fixing hole 75a. Here, the cable support part 75b comprises a support for the cable 69b, the support being attached to an outer surface part of the stay 75.

The stopper 75c is a protrusion provided above and in front of the fixing hole 75a.

The connecting member 73 is fastened to the outer surface of the stay 75 via one fixture 74 inserted into the fixing part 73a.

The stopper 75c abuts an upper surface of the flexible piping connecting part 73c of the connecting member 73 from above. Rotational movement in the up-down direction of the connecting member 73 about the fixture 74 as a rotary shaft is regulated by the stopper 75c. Consequently, the connecting member 73 can be firmly fixed to the stay 75 with a simple structure.

The connecting member 73 fixed to the stay 75 is located in front of the down frame 17 and behind the fork tube 24 and the bottom bridge 23 in the vehicle side view. The connecting member 73 is located in front of the front surface 17a of the down frame 17. Furthermore, the connecting member 73 is disposed below the bottom bridge 23 and above the front end portion of the upper surface of the cylinder part 32 in the vehicle side view. The connecting member 73 is offset and disposed on the other side (the left side) of the down frame 17 in the vehicle width direction, the down frame being located at the center in the vehicle width direction.

The metal piping connecting part 73b and the flexible piping connecting part 73c of the connecting member 73 are tubularly arranged coaxially with an axis 73d, and the axis 73d is inclined forward in an upward posture in the vehicle side view.

Inclination of the axis 73d to a horizontal plane is smaller than that of a lower surface 23a of the bottom bridge 23 inclined forward in an upward posture in the vehicle side view of FIG. 3, and the axis is more horizontal than the lower surface 23a. Consequently, a large distance between a forward extending part 85 of the flexible piping 72 located below the lower surface 23a of the bottom bridge 23 and the lower surface 23a can be acquired. Consequently, even in a case where the flexible piping 72 is bent upward with a stroke operation of the front fork 12 in the up-down direction, a space can be acquired between the lower surface 23a and the flexible piping 72.

A front end portion of the forward extending tube 71a, which is a terminal end portion of the metal piping 71, is inserted in and connected to the metal piping connecting part 73b of the connecting member 73 from behind.

Figure 4:
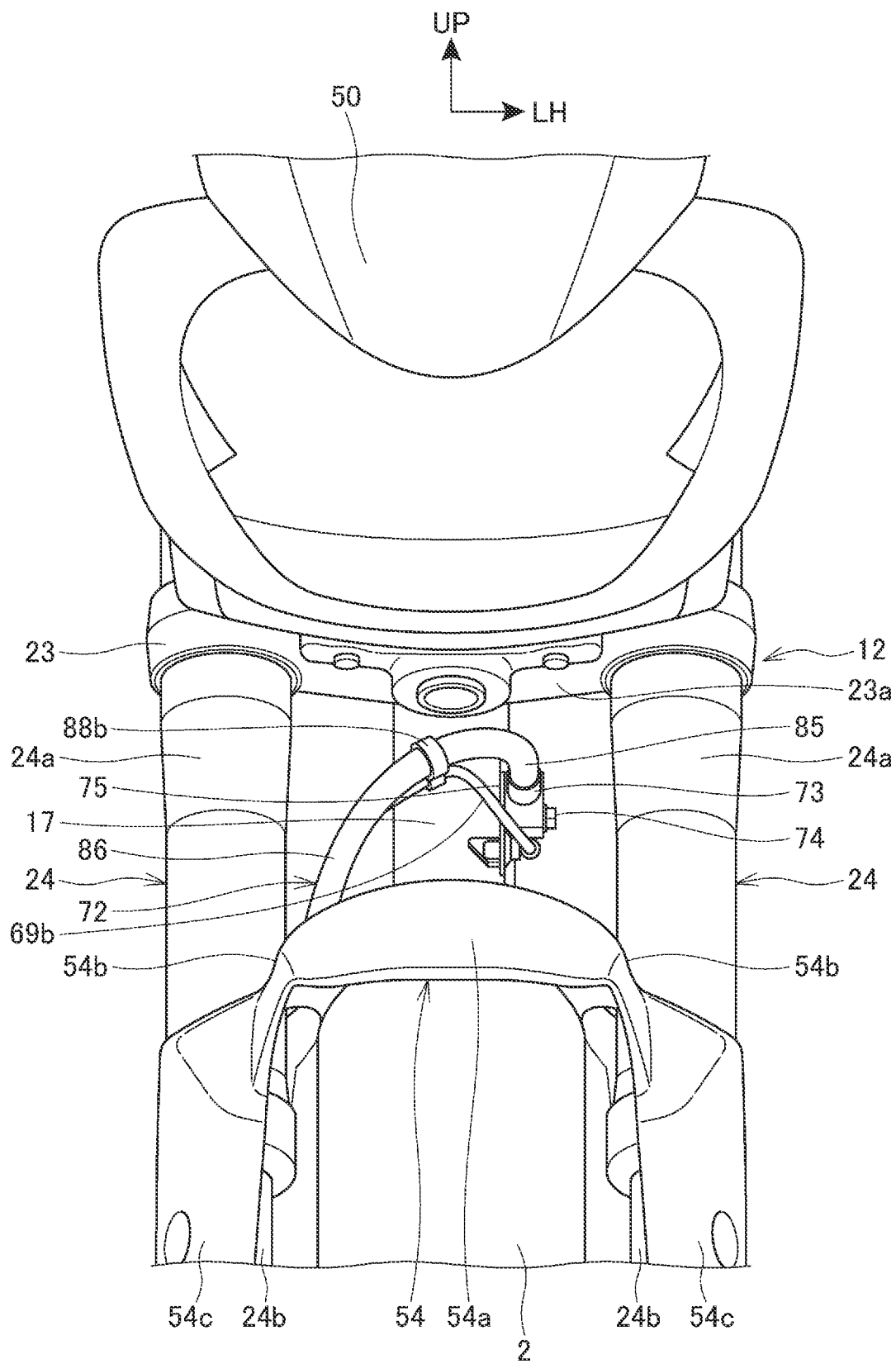
FIG. 4 is a front view of the front part of the motorcycle seen from the front.
Figure 5:
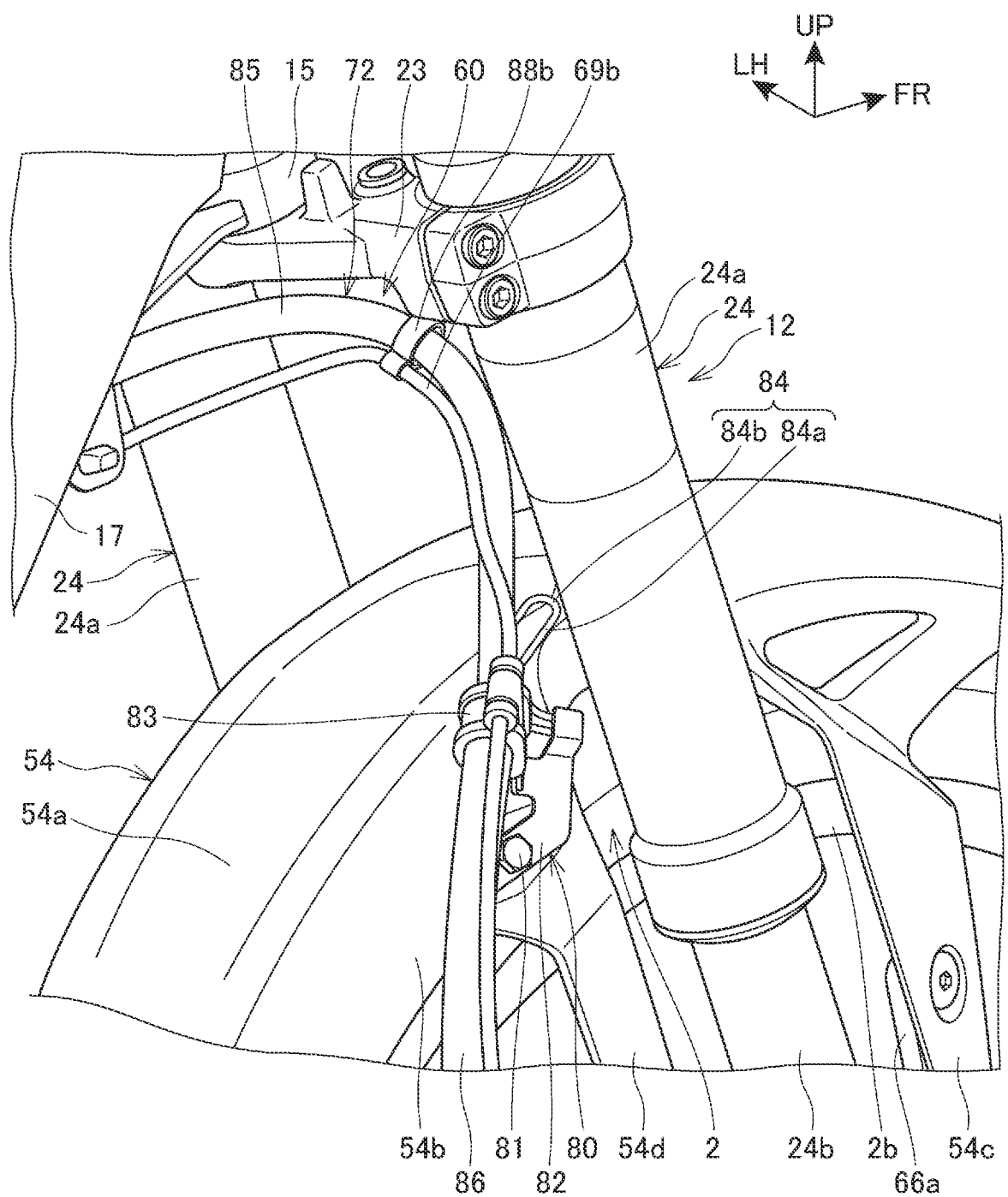
FIG. 5 is a perspective view of a routing state of flexible piping seen from behind.
Figure 6:
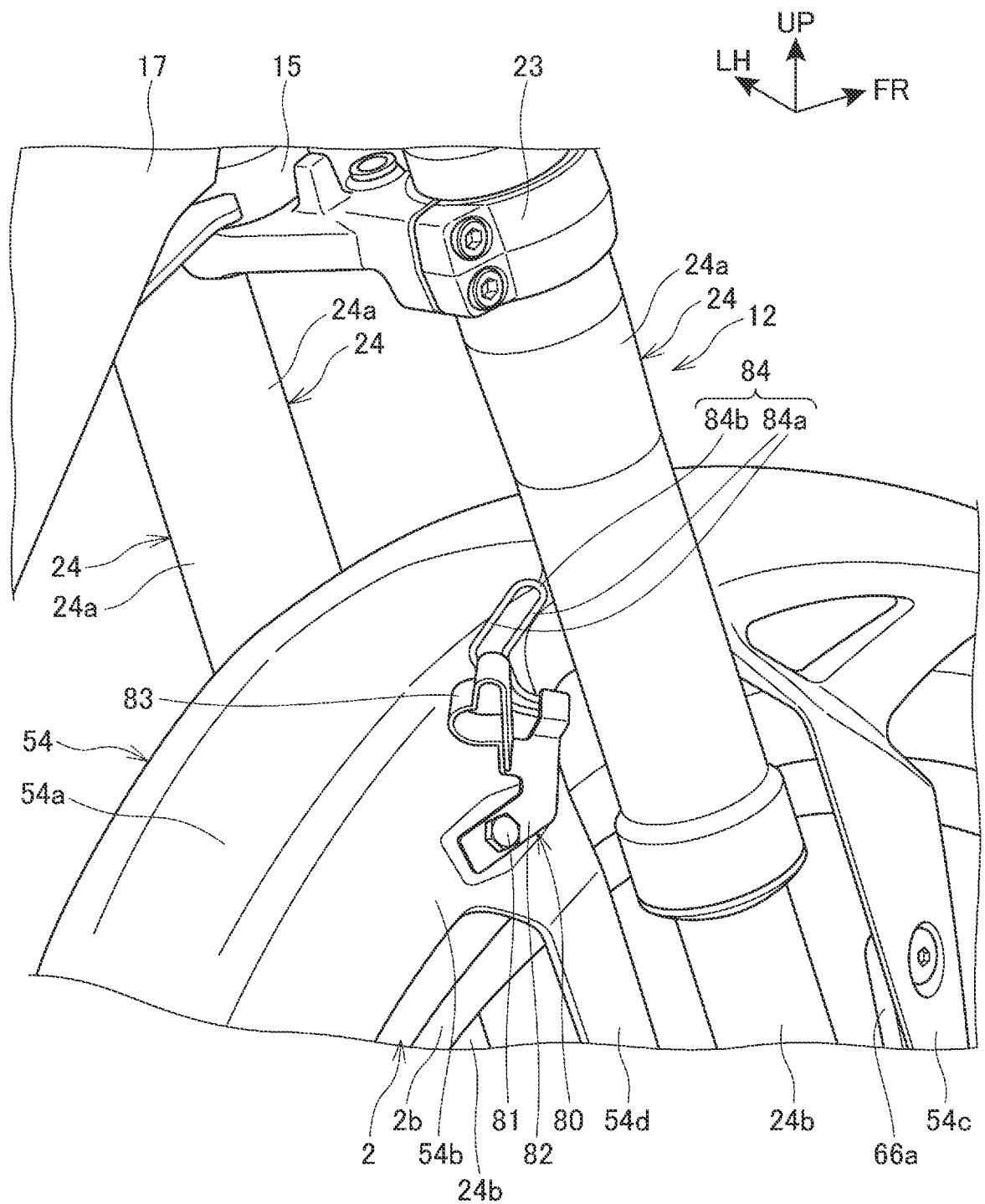
FIG. 6 is a perspective view of a surrounding part of a front fender seen from behind.

FIG. 4 is a front view of the front part of the motorcycle 1 seen from the front. FIG. 5 is a perspective view of a routing state of the flexible piping 72 seen from behind. FIG. 6 is a perspective view of a surrounding part of the front fender 54 seen from behind. FIG. 4 to FIG. 6 do not show the front side covers 51. FIG. 6 does not show the flexible piping 72.

With reference to FIG. 2 to FIG. 6, the flexible piping 72 extends downward and forward from the flexible piping connecting part 73c of the connecting member 73, to be connected to the caliper 58b of the front wheel brake 58.

The caliper 58b supported by the movable tube 24b moves relatively to the connecting member 73 with a steering operation of the front fork 12 in a right-left direction and the stroke operation of the front fork 12 in the up-down direction. Consequently, the flexible piping 72 connected to the caliper 58b is bent between the connecting member 73 and the caliper 58b with the operation of the front fork 12. In consequence, the flexible piping 72 is made of a highly flexible material so as to be able to follow the operation of the front fork 12. The flexible piping 72 is made of a material having a higher flexibility than a material of the metal piping 71 and the connecting member 73, and having a smaller rigidity than the metal piping 71 and the connecting member 73. The flexible piping 72 is, for example, a hose made of a rubber.

In the front fender 54, a piping fixing member 80 that supports the flexible piping 72 is provided.

The front fender 54 comprises a fender upper surface part 54a that covers an upper surface of the front wheel 2 from above, a pair of right and left fender side surface parts 54b that cover an upper part of the front wheel 2 from the sides, and attaching parts 54c, 54d extending downward from the fender side surface parts 54b in front of and behind the fork tube 24.

The front fender 54 is fixed to the fork tube 24 by fastening the attaching parts 54c, 54d to the fender stays 66a, 66c (FIG. 2).

The piping fixing member 80 is provided in the right fender side surface parts 54b behind the fixed tube 24a. That is, the piping fixing member 80 is located on one side (the right side) of the down frame 17 in the vehicle width direction, the down frame being located at the center in the vehicle width direction, and the member is disposed, in the right-left direction, opposite to the connecting member 73 located on the other side (the left side) in the vehicle width direction.

The piping fixing member 80 comprises a fixed part 82 fixed to the fender side surface part 54b via a bolt 81, a piping support part 83 extending upward from the fixed part 82, and a fender guard 84 extending upward from the fixed part 82 in front of the piping support part 83.

The piping support part 83 is formed in a ring shape into which the flexible piping 72 can be inserted, to hold an outer circumferential part of the flexible piping 72. A cushioning material is interposed between the piping support part 83 and the outer circumferential part of the flexible piping 72.

The fender guard 84 comprises a pair of right and left linear parts 84a extending upward and forward, and a coupling part 84b that couples front ends of the linear parts 84a. The fender guard 84 supports the flexible piping 72 from below to sandwich the flexible piping 72 between the right and left linear parts 84a, and regulates movement of the flexible piping 72 to a front fender 54 side.

The flexible piping 72 comprises the forward extending part 85 extending forward from the flexible piping connecting part 73c of the connecting member 73, and a downward extending part 86 bent and extending downward from a front end of the forward extending part 85.

A base end portion 85a of the forward extending part 85 connected to the flexible piping connecting part 73c is located in front of the down frame 17 and behind the fork tube 24.

The forward extending part 85 is connected to the flexible piping connecting part 73c disposed in an upward posture, and accordingly extends forward in an upward posture in the vehicle side view.

The forward extending part 85 extends forward from the connecting member 73 located on the other side of the down frame 17 in the vehicle width direction to a portion between the right and left fixed tubes 24a, below the bottom bridge 23 and above the front fender 54.

The downward extending part 86 extends downward from the forward extending part 85, extends from the other side (the left side) to the one side (the right side) in the vehicle width direction in front of the down frame 17, and straddles, in the vehicle width direction, the center in the vehicle width direction.

An upper end portion of the downward extending part 86 is located between the right and left fixed tubes 24a, and overlaps with the fixed tube 24a in the vehicle side view.

The downward extending part 86 extending downward between the right and left fixed tubes 24a curves above the front fender 54 to extend downward and rearward, curves on the right side of the front fender 54 to extend downward and forward behind the right fork tube 24, and has a lower end connected to a rear part of the caliper 58b.

An intermediate part of the downward extending part 86 in the up-down direction is fixed to the piping support part 83 of the piping fixing member 80 provided in the right fender side surface part 54b.

That is, the flexible piping 72 is supported on a vehicle body side by only the piping fixing member 80 of the front fender 54, and is not fixed to the bottom bridge 23, in a section between the connecting member 73 and the caliper 58b.

In the present embodiment, since the connecting member 73 is disposed in front of the down frame 17, the front end portion of the metal piping 71 can be disposed close to the caliper 58b in a vehicle front-rear direction.

Consequently, the flexible piping 72 can be firmly supported by using the rigidity of the metal piping 71, and hence, for example, it is not necessary to support the flexible piping 72 by the bottom bridge 23, and support parts for the flexible piping 72 can be decreased.

Since the connecting member 73 is supported by the stay 75 extending forward from the down frame 17, the connecting member 73 can be fixed in front of the down frame 17 with a simple structure, and the flexible piping 72 can be supported by effectively using the rigidity of the metal piping 71. Furthermore, since the connecting member 73 is made of a metal having a rigidity higher than that of the flexible piping 72, the flexible piping 72 can be supported by also using the rigidity of the connecting member 73.

The connecting member 73 and the stay 75 are covered with the left front side cover 51 from the outside in the vehicle width direction. Consequently, the connecting member 73 and the stay 75 can be hidden with the front side cover 51, and appearance improves.

With the stroke in a direction in which the fork tube 24 contracts, the flexible piping 72 receives a force in an upward moving direction, and this force is to rotationally move the connecting member 73 upward with the fixture 74 in the center. The rotation of the connecting member 73 is prevented by the stopper 75c that abuts the flexible piping connecting part 73c from above.

The cable 69b of the wheel speed sensor 69 is disposed along the metal piping 71 and the flexible piping 72. An outer diameter of the cable 69b is smaller than an outer diameter of the flexible piping 72.

The cable 69b is supported on the vehicle body side by the cable support part 75b of the stay 75, the piping support part 83, and a cable support part 66d provided in the rear part of the bottom case 66.

Furthermore, the cable 69b is bound to the flexible piping 72 by binding members 88a, 88b, 88c. The binding member 88a is provided beside the gusset 29, the binding member 88b is provided in front of the down frame 17 and between the right and left fork tubes 24, and the binding member 88c is provided between the front fender 54 and the caliper 58b.

As described above, according to the embodiment to which the present invention is applied, the motorcycle 1 comprises the front fork 12 that supports the front wheel 2, the head pipe 15 that rotationally movably supports the front fork 12, the down frame 17 extending downward from the head pipe 15, the front wheel brake 58 supported by the front fork 12, to brake the front wheel 2, the braking force adjustment device 59 that controls the braking force of the front wheel brake 58, and the output piping 62 that connects the braking force adjustment device 59 and the front wheel brake 58, the output piping 62 comprises the metal piping 71 extending forward from the braking force adjustment device 59 disposed behind the down frame 17, the flexible piping 72, and the connecting member 73 that connects the metal piping 71 and the flexible piping 72, the connecting member 73 is disposed in front of the down frame 17, and the flexible piping 72 extends forward from the connecting member 73, to be connected to the front wheel brake 58. According to this configuration, the connecting member 73 that connects the metal piping 71 and the flexible piping 72 is located in front of the down frame 17, and the metal piping 71 noticeably extends forward. Therefore, the flexible piping 72 can be supported by using high rigidity of the metal piping 71. Consequently, the support parts for the output piping 62 can be decreased.

Furthermore, the connecting member 73 is disposed behind the front fork 12. According to this configuration, the connecting member 73 can be disposed without disturbing steering of the front fork 12, while a length of the flexible piping 72 can be acquired, and the flexible piping 72 can be efficiently bent.

Additionally, the connecting member 73 is fixed to the stay 75 extending forward from the down frame 17. According to this configuration, the connecting member 73 can be firmly supported at the position in front of the down frame 17 by the stay 75 extending forward from the down frame 17.

Furthermore, the front wheel brake 58 is disposed on one side of the down frame 17 in the vehicle width direction, and the connecting member 73 is disposed on the other side of the down frame 17 in the vehicle width direction. According to this configuration, as the flexible piping 72 extends in the right-left direction, and the large length of the flexible piping 72 can be acquired, the flexible piping 72 can be efficiently bent.

Additionally, the flexible piping 72 extends forward in an upward posture from the connecting member 73 in the vehicle side view. According to this configuration, the flexible piping 72 extends upward, and the large length of the flexible piping 72 can be acquired. Therefore, the flexible piping 72 can be efficiently bent.

Furthermore, the stopper 75c that regulates the rotational movement of the connecting member 73 in the up-down direction is provided. According to this configuration, the rotational movement of the connecting member 73 in the up-down direction can be regulated with the stopper 75c, and the shaking of the flexible piping 72 can be appropriately regulated.

Additionally, the front fender 54 that covers the front wheel 2 from above is provided, and the fender guard 84 that receives the flexible piping 72 is provided between the front fender 54 and the flexible piping 72. According to this configuration, the fender guard 84 can prevent contact between the flexible piping 72 and the front fender 54, and can protect the flexible piping 72 and the front fender 54.

Furthermore, an intermediate part of the flexible piping 72 between the connecting member 73 and the front wheel brake 58 is fixed to the front fender 54. According to this configuration, the flexible piping 72 can be supported by using the front fender 54.

Additionally, the wheel speed sensor 69 that detects the rotation of the front wheel 2 is provided, and the cable 69b of the wheel speed sensor 69 is fixed to the stay 75. According to this configuration, the cable 69b of the wheel speed sensor 69 can be fixed by using the stay 75 for the output piping 62.

Note that the above embodiment illustrates one aspect to which the present invention is applied, and the present invention is not limited to the above embodiment.

In the above embodiment, the motorcycle 1 has been described as an example of the saddle riding type vehicle, but the present invention is not limited to this example, and the present invention is applicable to a three-wheel saddle riding type vehicle comprising two front or rear wheels or a saddle riding type vehicle comprising four or more wheels.

REFERENCE SIGNS LIST 1 motorcycle (a saddle riding type vehicle)
2 front wheel
12 front fork
15 head pipe
17 down frame
54 front fender (fender)
58 front wheel brake
59 braking force adjustment device
62 output piping (brake piping)
69b cable
69 wheel speed sensor (sensor)
71 metal piping
72 flexible piping
73 connecting member (connecting part)
75 stay
75c stopper
84 fender guard

The invention claimed is:

1. A saddle riding vehicle comprising:
a front fork that supports a front wheel,
a head pipe that rotationally movably supports the front fork,
a down frame extending downward from the head pipe,
a front wheel brake supported by the front fork, to brake the front wheel,
a braking force adjustment device that controls braking force of the front wheel brake, and
brake piping that connects the braking force adjustment device and the front wheel brake, wherein the brake piping comprises metal piping extending forward from the braking force adjustment device disposed behind the down frame, flexible piping, and a connecting member that connects the metal piping and the flexible piping,
the connecting member is disposed in front of the down frame, and the flexible piping extends forward from the connecting member, to be connected to the front wheel brake,
the connecting member is fixed to a stay extending forward from the down frame, the stay comprises a stopper protruding in a vehicle width direction,
the connecting member comprises a fixing part that is a block shape, and a flexible piping connecting part that is in a tubular shape and that extends forward from the fixing part,
the flexible piping is connected to the flexible piping connecting part,
the connecting member is fastened to the stay via a fixture inserted into the fixing part in the vehicle width direction,
the stay comprises a fixing hole in which the fixture is fastened, and the stopper is disposed above and in front of the fixing hole so as to abut an upper surface of the flexible piping connecting part from above and to regulate rotational movement of the connecting member about the fixture as a rotary shaft.

2. The saddle riding vehicle according to claim 1, wherein the connecting part is disposed behind the front fork.

3. The saddle riding vehicle according to claim 1, wherein the front wheel brake is disposed on one side of the down frame in the vehicle width direction, and the connecting part is disposed on the other side of the down frame in the vehicle width direction.

4. The saddle riding vehicle according to claim 1, wherein the flexible piping extends forward in an upward posture from the connecting member in vehicle side view.

5. The saddle riding vehicle according to claim 1, wherein a fender that covers the front wheel from above is provided, and a fender guard that receives the flexible piping is provided between the fender and the flexible piping.

6. The saddle riding vehicle according to claim 5, wherein an intermediate part of the flexible piping between the connecting part member and the front wheel brake is fixed to the fender.

7. The saddle riding vehicle according to claim 1, wherein a sensor that detects rotation of the front wheel is provided, and a cable of the sensor is fixed to the stay.

* * * * *